US011352056B2

(12) United States Patent
Moon et al.

(10) Patent No.: US 11,352,056 B2
(45) Date of Patent: Jun. 7, 2022

(54) SUSPENSION JOINING STRUCTURE

(71) Applicants: HYUNDAI MOTOR COMPANY, Seoul (KR); KIA MOTORS CORPORATION, Seoul (KR)

(72) Inventors: Ha Kyung Moon, Incheon (KR); Gab Bae Jeon, Hwaseong-si (KR); Jae Won Lee, Bucheon-si (KR); Jae Young Kim, Ulsan (KR); Soon Huh, Seoul (KR); Byung Kyu Lee, Siheung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/038,464

(22) Filed: Sep. 30, 2020

(65) Prior Publication Data

US 2021/0394827 A1     Dec. 23, 2021

(30) Foreign Application Priority Data

Jun. 22, 2020   (KR) .......................... 10-2020-0075427

(51) Int. Cl.
*B62D 7/16*      (2006.01)
*B60G 7/00*      (2006.01)
(Continued)

(52) U.S. Cl.
CPC .............. *B62D 7/16* (2013.01); *B60G 7/005* (2013.01); *B60G 7/008* (2013.01); *B62D 1/02* (2013.01);
(Continued)

(58) Field of Classification Search
CPC .......... B62D 7/06; B62D 7/1545; B62D 7/16; B62D 7/18; B62D 7/20; B62D 5/0418;
(Continued)

(56) References Cited

U.S. PATENT DOCUMENTS 3,219,372 A * 11/1965 Herbenar ................. B62D 7/16
403/7
4,802,688 A * 2/1989 Murakami ............. B60G 3/265
280/124.138

(Continued)

FOREIGN PATENT DOCUMENTS

CN   106428198 A * 2/2017
CN   108297930 A * 7/2018
(Continued)

OTHER PUBLICATIONS

Burkersroda, et al. 'Translation of DE 102017216983 A1 Obtained Oct. 8, 2021'. Mar. 28, 2019. Entire Document. (Year: 2019).*

*Primary Examiner* — Jonathan Ng
*Assistant Examiner* — Scott F. Underwood
(74) *Attorney, Agent, or Firm* — Morgan, Lewis & Bockius LLP

(57) ABSTRACT

A suspension joining structure includes: a lower arm having one end fastened to a vehicle body; an assist knuckle having a strut thereon; a fastening unit configured to connect one end of the lower arm and a lower end of the assist knuckle to each other; a suspension fastened to the assist knuckle and rotating independently of the assist knuckle for steering of a wheel; a steering input part connected to the assist knuckle, and configured such that a steering force is applied to the suspension upon steering; and a rotation transfer unit arranged between the suspension and the steering input part.

8 Claims, 12 Drawing Sheets

(51) Int. Cl.
*B62D 7/18* (2006.01)
*B62D 1/02* (2006.01)
*B62D 7/06* (2006.01)
*B62D 7/20* (2006.01)

(52) U.S. Cl.
CPC ............. *B62D 7/06* (2013.01); *B62D 7/18* (2013.01); *B62D 7/20* (2013.01)

(58) Field of Classification Search
CPC .......... B62D 5/04; B60G 7/005; B60G 7/008; B60G 2200/44
See application file for complete search history.

(56) References Cited

U.S. PATENT DOCUMENTS

| | | | | |
|---|---|---|---|---|
| 5,346,241 A * | 9/1994 | Lee | ............ | B60G 3/265 280/124.142 |
| 5,938,219 A * | 8/1999 | Hayami | ............ | B60G 3/20 280/124.135 |
| 6,367,830 B1 * | 4/2002 | Annequin | ............ | B60G 15/063 280/124.145 |
| 7,204,341 B2 * | 4/2007 | Lundmark | ............ | B60G 7/008 180/402 |
| 8,152,185 B2 * | 4/2012 | Siebeneick | ............ | B60G 7/008 280/124.134 |
| 9,085,302 B2 | 7/2015 | Borroni-Bird et al. | | |
| 9,821,835 B2 * | 11/2017 | Ferrer-Dalmau Nieto | ............ | B62D 5/0418 |
| 2003/0111289 A1 * | 6/2003 | Brill | ............ | B62D 5/0418 180/431 |
| 2003/0234504 A1 * | 12/2003 | Frantzen | ............ | B60G 15/07 280/93.512 |
| 2007/0045036 A1 * | 3/2007 | Takeuchi | ............ | B60G 17/005 180/411 |
| 2008/0303234 A1 * | 12/2008 | Mc Cann | ............ | B62D 7/18 280/93.511 |
| 2011/0174568 A1 * | 7/2011 | Kuwabara | ............ | B62K 5/01 180/376 |
| 2013/0008736 A1 * | 1/2013 | Kuwabara | ............ | B60K 17/303 180/291 |
| 2018/0281853 A1 * | 10/2018 | Gordon | ............ | B60B 35/128 |
| 2020/0070883 A1 * | 3/2020 | Du | ............ | B62D 5/0418 |
| 2020/0224728 A1 * | 7/2020 | Gao | ............ | B62D 7/023 |
| 2021/0253159 A1 * | 8/2021 | Toyoda | ............ | B62D 5/0442 |

FOREIGN PATENT DOCUMENTS

| | | | | |
|---|---|---|---|---|
| DE | 102007047789 A1 * | 5/2009 | ............ | B60G 3/20 |
| DE | 102012214352 A1 * | 2/2014 | ............ | B60G 7/008 |
| DE | 10 2017 216 983 A1 | 3/2019 | | |
| FR | 2503072 A1 * | 10/1982 | ............ | B62D 7/20 |
| FR | 2896471 A3 * | 7/2007 | ............ | B62D 5/0418 |
| KR | 20060000529 A * | 1/2006 | | |
| KR | 20070035874 A * | 4/2007 | | |
| KR | 10-2007-0103191 A | 10/2007 | | |

\* cited by examiner

[FIG. 1] -PRIOR ART-
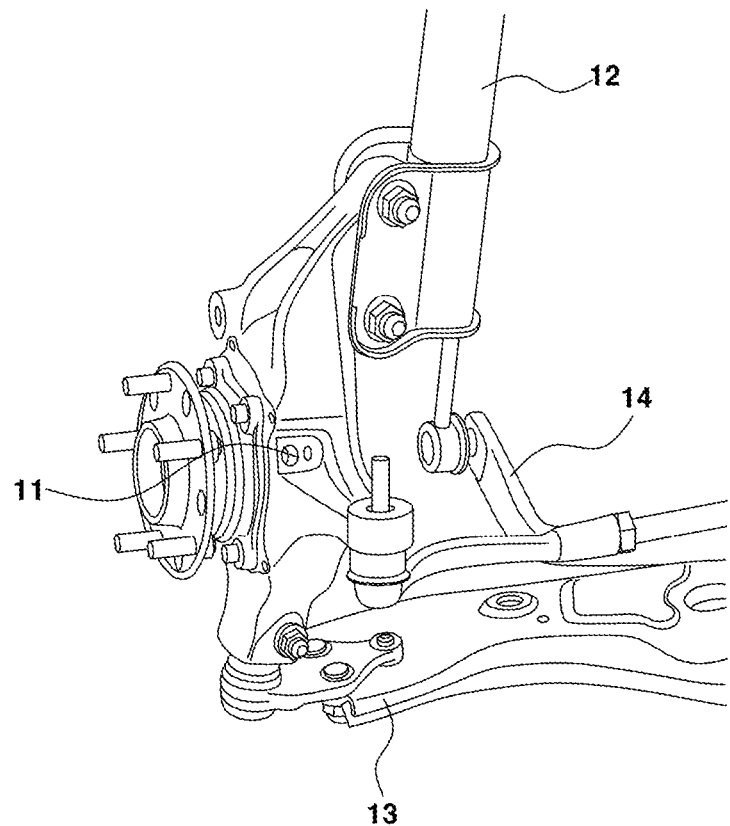

[FIG. 2]
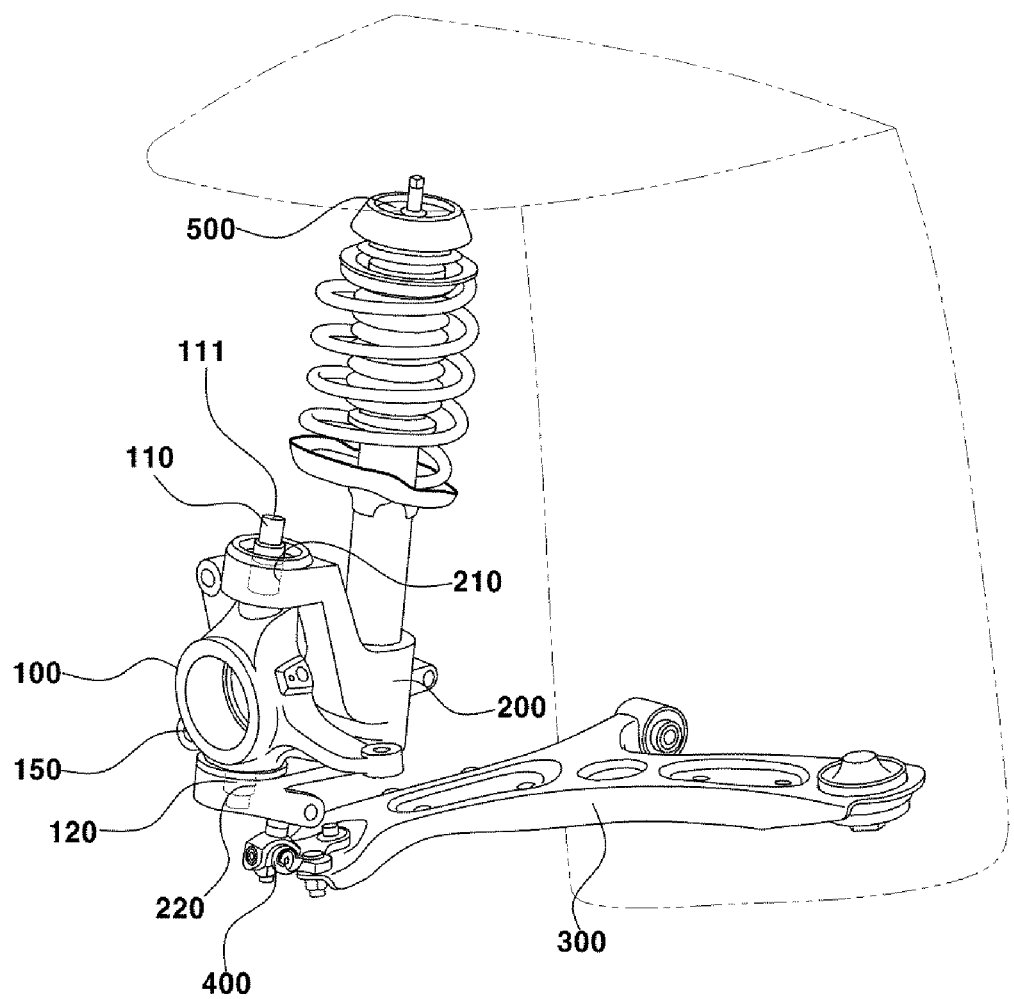

[FIG. 3A]
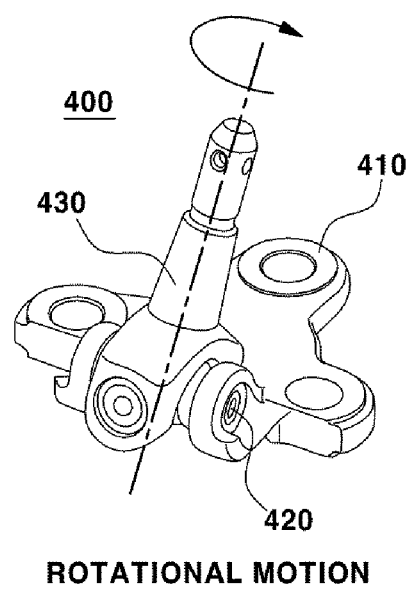
ROTATIONAL MOTION

[FIG. 3B]
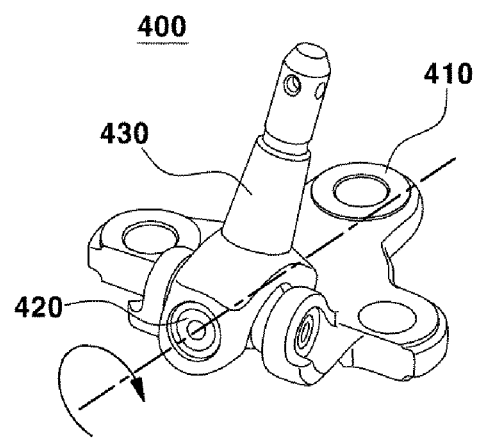
WHEEL CENTER FRONT
-REAR BEHAVIOR ABSORPTION
(WITH RESPECT TO VEHICLE)

[FIG. 3C]
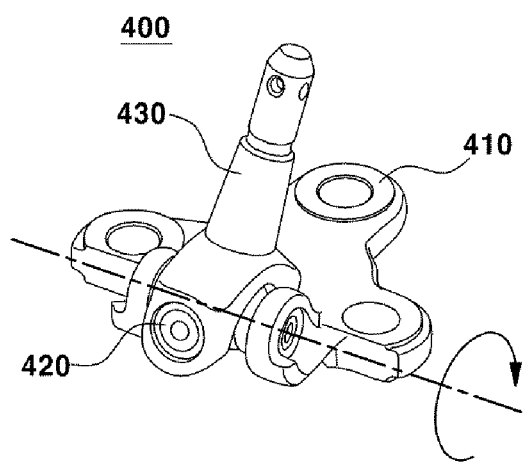
**WHEEL CENTER LEFT
-RIGHT BEHAVIOR ABSORPTION
(WITH RESPECT TO VEHICLE)**

[FIG. 4]
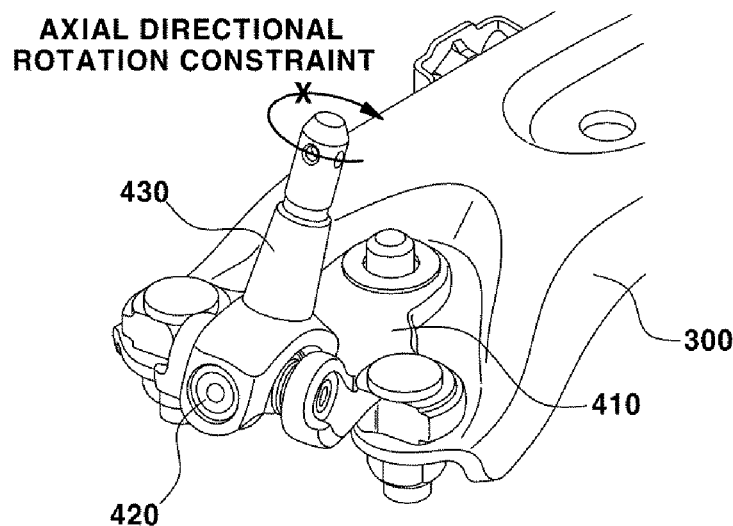
[FIG. 5]
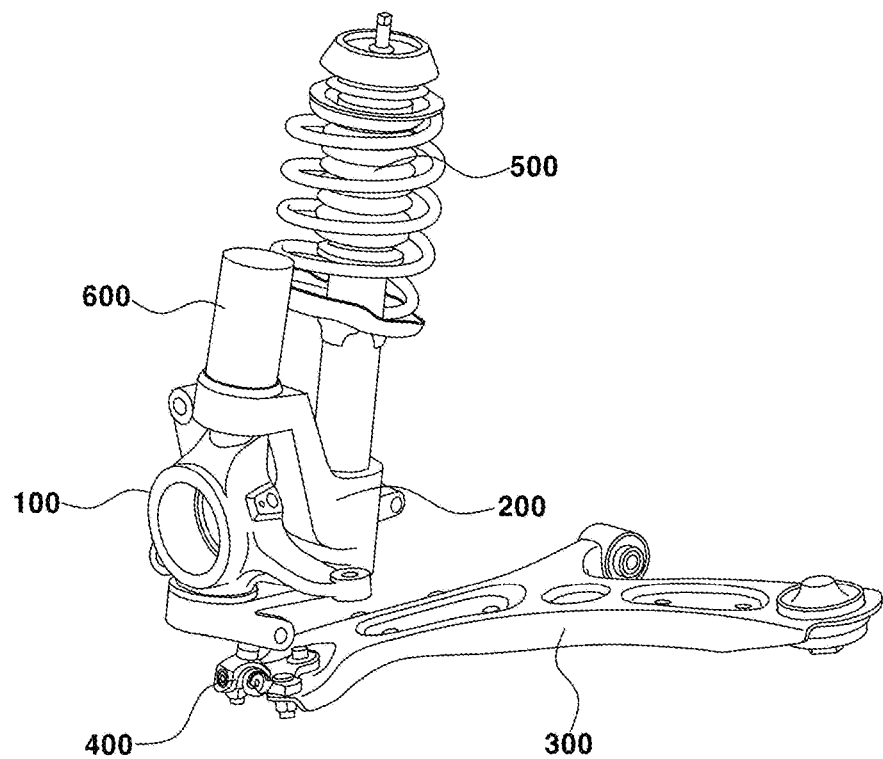

[FIG. 6A]
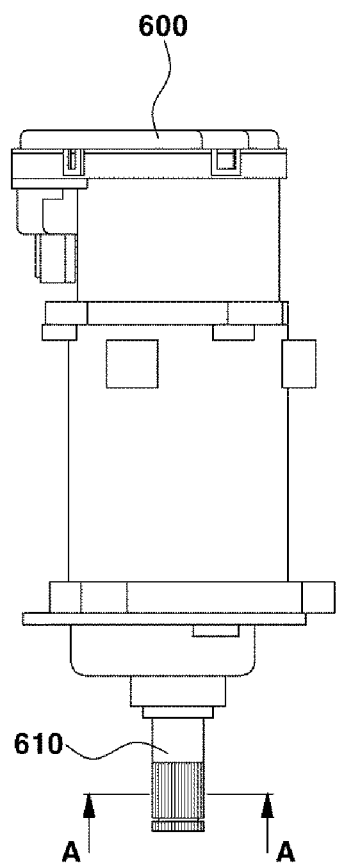

[FIG. 6B]
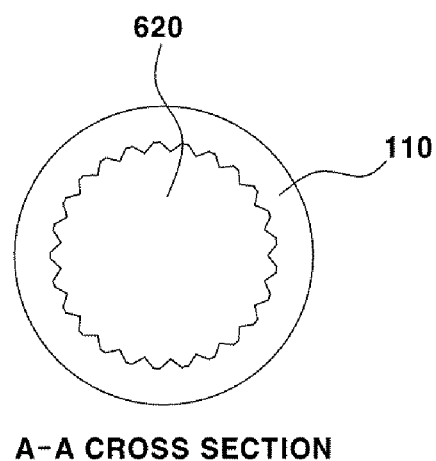
A-A CROSS SECTION

[FIG. 7a]
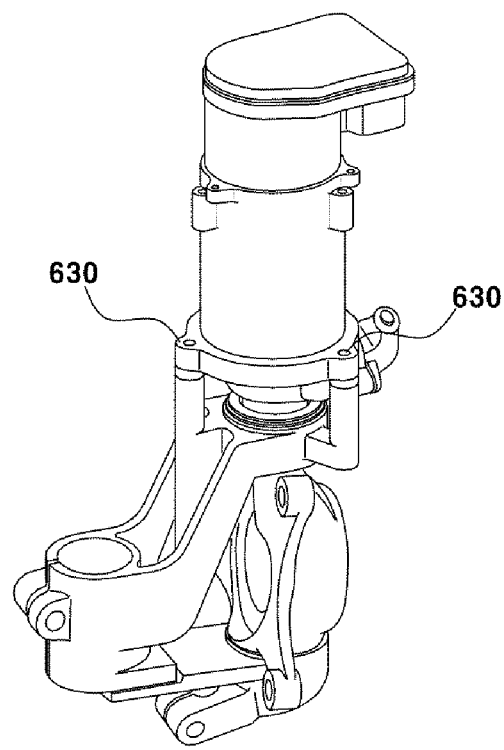

[FIG. 7B]
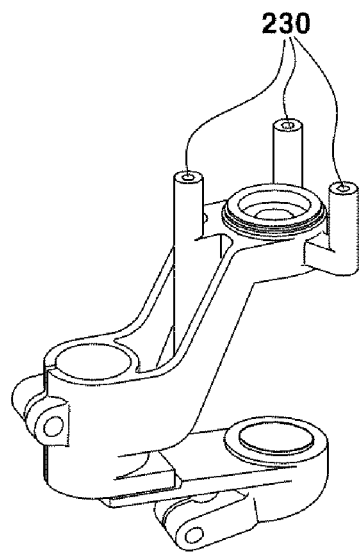

[FIG. 8A]
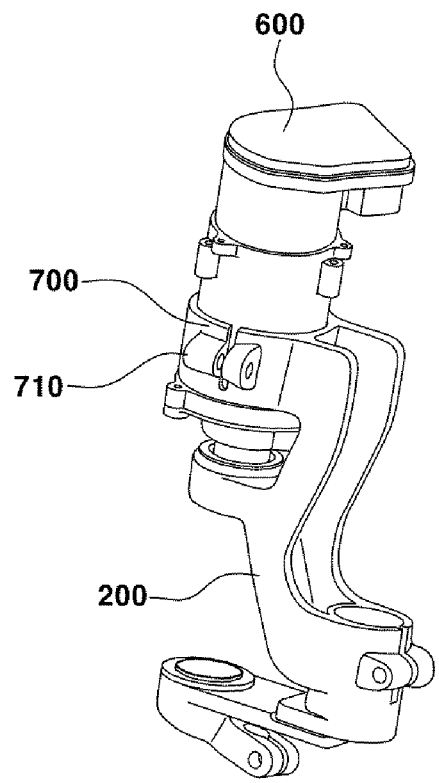

[FIG. 8B]
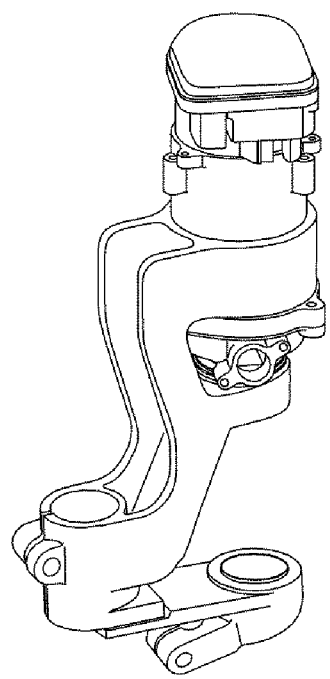

SUSPENSION JOINING STRUCTURE

CROSS-REFERENCE TO RELATED APPLICATION

This application claims the benefit of priority to Korean Patent Application No. 10-2020-0075427 filed on Jun. 22, 2020, the entire contents of which are incorporated herein by reference.

TECHNICAL FIELD

The present disclosure relates to a suspension joining structure, and to a suspension joining structure which is configured so that each wheel may perform independent steering in response to a steering input signal of a user by providing a joining structure of a suspension, a lower arm, and a steering input unit of a suspension.

BACKGROUND

A suspension for damping vibrations generated between wheels and the road surface is provided at a portion where the wheels are installed in a vehicle.

Various types of suspensions are presented, and a suspension suitable for each type of the vehicle is selected and applied.

An example of a conventional suspension joining structure for adapting the McPherson suspension is illustrated in FIG. 1.

The McPherson suspension includes a knuckle 11, a shock absorber 12 provided on the upper portion of the knuckle to absorb vibration, a lower arm 13 connected to the lower portion of the knuckle 11, and a stabilizer 14 connected to the lower portion of the knuckle 11 or the lower portion of the shock absorber 12.

The knuckle 11 includes a wheel mount part on which a wheel W is installed on the center of the knuckle 11, a shock absorber connection part connected to the shock absorber 12 on the upper portion of the knuckle 11, and a lower arm connection part connected to the lower arm 13 on the lower portion of the knuckle 11.

However, in the case of the aforementioned structure having the McPherson suspension, if an operation force is applied to the knuckle upon steering, there is a structural limitation in that a steering force may be applied to the wheel only when the knuckle is rotated simultaneously with an assist knuckle.

The above information disclosed in this Background section is only for enhancement of understanding of the background of the disclosure and accordingly it may contain information that does not form the prior art that is already known in this country to a person of ordinary skill in the art.

SUMMARY OF THE DISCLOSURE

The present disclosure is intended to solve the above problem, and an object of the present disclosure is to provide an assist knuckle fastened to a lower arm, and to provide a suspension joining structure having a suspension including a RevoKnuckle type located at the central axis of the assist knuckle to perform an independent rotation.

In addition, another object of the present disclosure is to provide a technology of a fastening structure corresponding to a vertical gap of a suspension through a rotation transfer unit located between a steering input part and the suspension.

The objects of the present disclosure are not limited to the aforementioned objects, and other objects of the present disclosure not mentioned may be understood by the following description, and may be more clearly understood by the exemplary embodiments of the present disclosure. In addition, the objects of the present disclosure may be realized by the means of the claims and combinations thereof.

A suspension joining structure for achieving the aforementioned objects of the present disclosure includes the following configuration.

In an exemplary embodiment of the present disclosure, a suspension joining structure includes: a lower arm having one end fastened to a vehicle body; an assist knuckle having a strut thereon; a fastening unit configured to connect one end of the lower arm and a lower end of the assist knuckle to each other; a suspension fastened to the assist knuckle and rotating independently of the assist knuckle to assist the steering of a wheel; a steering input part connected to the assist knuckle, and configured such that a steering force is applied to the suspension upon steering; and a rotation transfer unit arranged between the suspension and the steering input part.

The fastening unit is composed of a universal joint.

The suspension joining structure includes: an upper hole which is located on an upper end of the assist knuckle so that an upper end of the suspension is inserted into the upper hole; and a lower hole located on a lower end of the assist knuckle so that a lower end of the suspension is inserted into the lower hole, in which the suspension is configured to be rotated with respect to the upper hole and the lower hole.

The fastening unit further includes: a yoke located on the lower arm; a ball stud fastened to the assist knuckle; and a cross shaft located on the yoke and the ball stud so that the yoke and the ball stud have center axes different from each other.

The rotation transfer unit further includes: a spline rod formed on the center axis of the steering input part; and an inlet located on the suspension and configured so that the spline rod is drawn into the inlet.

The steering input part includes: at least one mounting part fastened to the assist knuckle.

One end of the assist knuckle includes: a fastener configured at a location corresponding to the at least one mounting part.

The steering input part is located on an upper end of the assist knuckle in parallel to the strut.

The suspension joining structure further includes: a fixing part into which the steering input part may be inserted on an upper end of the assist knuckle.

The fixing part is fastened by a pinch bolt and configured to fix the steering input part and the assist knuckle.

The present disclosure may obtain the following effects by the exemplary embodiments and the configuration, combination, and use relationship described below.

The present disclosure provides the suspension rotated independently of the assist knuckle, thereby providing the high degree of freedom of the suspension.

In addition, the present disclosure provides the structural stability capable of absorbing the vertical behavior applied to the suspension through the steering input part and the rotation transfer unit located on the suspension.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein:

FIG. 1 is a diagram illustrating the joining relationship of a MacPherson strut suspension as the related art.

FIG. 2 is a perspective diagram illustrating a suspension joining structure, as an exemplary embodiment of the present disclosure.

FIGS. 3A, 3B, and 3C are diagrams illustrating the degree of freedom of the motion of a fastening unit of the suspension joining structure, as the exemplary embodiment of the present disclosure.

FIG. 4 is an enlarged diagram illustrating the fastening unit of the suspension joining structure, as the exemplary embodiment of the present disclosure.

FIG. 5 is a perspective diagram illustrating the suspension joining structure including a steering actuator, as the exemplary embodiment of the present disclosure.

FIGS. 6A and 6B are enlarged diagrams illustrating a rotation transfer unit, as the exemplary embodiment of the present disclosure.

FIGS. 7A, 7B, 8A and 8B are diagrams illustrating the fastened relationship between a steering input part and a mounting part, as the exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, exemplary embodiments of the present disclosure will be described in more detail with reference to the accompanying drawings. The exemplary embodiments of the present disclosure may be modified in various forms, and the scope of the present disclosure should not be interpreted as being limited to the following exemplary embodiments. The present exemplary embodiment is provided to more fully describe the present disclosure to those skilled in the art.

In addition, terms such as " . . . knuckle", " . . . unit", and " . . . part" described in the specification mean a unit which processes at least one function or operation, which may be implemented in hardware or a combination of hardware.

Hereinafter, exemplary embodiments will be described in detail with reference to the accompanying drawings, and in describing the exemplary embodiments with reference to the accompanying drawings, the same or corresponding components will be denoted by the same reference numbers, and the overlapping descriptions thereof will be omitted.

The present disclosure relates to a suspension joining structure which is configured so that a suspension 100 is located inside an assist knuckle 200 to be rotatable independently of the assist knuckle 200. Here, the suspension 100 may include a MacPherson strut or a RevoKnuckle which is well known in the art as a variation of the MacPherson strut suspension design so as to improve drawbacks of the MacPherson strut suspension explained above (for example, https://link.springer.com/article/10.1007/BF03225151).

Moreover, the suspension joining structure according to the present disclosure includes a structure which is fastened to each wheel and may be steered independently, and the corresponding wheel of the vehicle mounted with the suspension joining structure may be configured to have an outer wheel with a steering angle of 60 degrees and have an inner wheel with a steering angle of 90 degrees.

FIG. 2 is a perspective diagram illustrating the suspension joining structure, as the exemplary embodiment of the present disclosure.

The suspension joining structure of the present disclosure is composed of a lower arm 300 fastened to a vehicle body or a frame and located in a width direction of the vehicle, and the assist knuckle 200 configured to be located on one end of the lower arm 300 and located on the upper end of a strut 500. The strut 500 located on the upper end of the assist knuckle 200 is used as a concept including a shock absorber.

The suspension joining structure includes the suspension 100 located in a recessed space of the assist knuckle 200, and having the ends fastened to the insides of both extending ends of the assist knuckle 200, and one surface of the suspension 100 includes a wheel mount part 150 on which the wheel is mounted.

According to the exemplary embodiment of the present disclosure, the suspension 100 includes an upper end and a lower end so as to be fastened between an upper hole 210 and a lower hole 220 of the assist knuckle 200. The suspension 100 is configured to be rotated using the upper end and the lower end as the center axis, and to have the same rotational axis as the central axis connecting the upper hole 210 and the lower hole 220 of the assist knuckle 200.

Moreover, the suspension joining structure includes a steering input part 600 configured to be fastened to the suspension 100 so that the steering force is applied in response to the user's steering input. In the exemplary embodiment of the present disclosure, the steering input part 600 may be composed of a steering motor configured to receive an electronic signal to change the steering angle of the suspension 100. The steering input part 600 may be configured to be fastened to the assist knuckle 200, respectively, in a state of being parallel to the strut 500. In the exemplary embodiment of the present disclosure, the suspension joining structure is configured so that the strut 500 is fastened to the lower end of the assist knuckle 200 and the steering input part 600 is located at a location corresponding to the upper hole 210 of the assist knuckle 200.

As the exemplary embodiment, if the steering input part 600 is composed of the steering motor, the upper end 110 of the suspension 100 and the steering motor are fixed to each other, and the steering motor may be configured to rotate the suspension 100 in response to the user's steering input.

The steering input part 600 and the suspension 100 are configured to be fastened inside the assist knuckle 200. In the exemplary embodiment of the present disclosure, the suspension joining structure is configured so that the steering input part 600 and the suspension 100 are fastened to each other through the rotation transfer unit 610 to transfer the rotational force of the steering input part 600 to the suspension 100. The rotation transfer unit 610 according to the present disclosure may be composed of a spline rod 620 configured as the rotation center axis of the steering input part 600, and an inlet 111 located on one end of the suspension 100 so that the spline rod 620 is inserted. The inlet 111 may be located on the upper end 110 of the suspension 100.

The spline rod 620 is configured to be inserted into the inlet 111 of the suspension 100, and configured so that the inlet 111 of the suspension 100 and the spline rod 620 may be moved in a longitudinal direction in response to a height directional shock generated in the vehicle body. Accordingly, even when the shock is applied in the longitudinal direction of the spline rod 620, the spline rod 620 is configured to maintain the fastening state of the steering input part 600 in response to the vertical movement of the suspension 100, and configured so that the rotational force of the steering input part 600 is applied to the suspension 100.

Since the inlet 111 is configured to penetrate the upper end 110, and the spline rod 620 is configured to be located on at least a portion of the inlet 111, the spline rod 620 may be configured to be movable in the longitudinal direction of the inlet 111. Accordingly, the spline rod 620 may be moved along the inside of the inlet 111 in response to the height directional shock of the vehicle.

Since one end of the lower arm and the lower end of the assist knuckle 200 are configured to be coupled to each other through a fastening unit 400, the fastening unit 400 is configured to be prevented from being rotated around the center axis in the height direction of the assist knuckle 200 and to absorb the front-rear behavior and the left-right behavior applied from the wheels. Accordingly, the suspension 100 may be rotated inside the assist knuckle 200 independently of the assist knuckle 200, and the assist knuckle 200 may maintain the state of being fixed to the lower arm 300 and the strut 500.

The fastening unit 400 is composed of a universal joint to limit the rotational force of the assist knuckle 200 and configured to absorb the vibrations in the front-rear direction and the width direction of the vehicle applied from the wheels.

The fastening unit 400 is configured at a location adjacent to the lower hole 220 of the assist knuckle 200 into which the lower end 120 of the suspension 100 is inserted. In the exemplary embodiment of the present disclosure, the suspension joining structure is configured to further include a pinch bolt or a lock nut integrally fixing the assist knuckle 200 and the ball stud 430 after the ball stud 430 of the fastening unit 400 is inserted into the assist knuckle 200.

FIGS. 3A, 3B, 3C and 4 illustrate the fastening unit 400 fastened to the lower arm 300, and illustrate the degree of freedom of the motion corresponding to the motions in three directions.

The fastening unit 400 is composed of a yoke 410 located on one end of the lower arm 300, and the ball stud 430 fastened to the assist knuckle 200, and includes a cross shaft 420 configured so that the yoke 410 and the ball stud 420 are fastened to the center axes different from each other. The ball stud 430 is configured to be fixed to the assist knuckle 200 through the pinch bolt or the lock nut. Accordingly, the assist knuckle 200 is configured to be fixed to the ball stud 430 located on the lower end and the strut 500 located on the upper end.

If the behavior in the front-rear direction applied from the wheels occurs, the fastening unit 400 is configured so that the shock is absorbed through the rotation between the components connected with respect to the central axis of the cross shaft 420 fastened to the ball stud 430, and if the left-right behavior applied from the wheels occurs, the fastening unit 400 is configured so that the shock is absorbed through the rotation between the components connected with respect to the central axis of the cross shaft 420 fastened to the lower arm 300.

More preferably, if the front-rear behavior of the wheels occurs, the fastening unit 400 is configured so that the ball stud 430 is rotatable with respect to the central axis of the cross shaft 420 formed along the width direction of the vehicle and thus configured so that the behavior of the wheel is absorbed. In addition, if the behavior of the wheel in the width direction occurs, the fastening unit 400 is configured so that the ball stud 430 is rotatable in the width direction of the vehicle with respect to the central axis of the cross shaft 420 formed along the longitudinal direction of the vehicle and thus configured so that the behavior may be absorbed.

In summary, the fastening unit 400 is configured to have two rotary shafts with respect to the cross shaft 420, and configured so that the front-rear behavior and the left-right behavior applied from the wheels are absorbed by the respective different rotational shafts.

However, the assist knuckle 200 fastened to the ball stud 430 is configured to maintain the fixed state, thereby maintaining the state where the degree of freedom of the rotation of the assist knuckle 200 using the ball stud 430 as the center axis is limited.

FIG. 5 illustrates a configuration of the steering motor fastened to the upper end 110 of the suspension 100 as the steering input part 600, and FIG. 6 is a cross-sectional diagram illustrating the steering input part 600 and the suspension 100 fastened through the rotation transfer unit 610.

The steering motor is configured to be integrally connected with the upper end 110 of the suspension 100, and configured to directly transfer the rotational force of the steering motor to the suspension 100. The steering motor is controlled by the rotational force through a controller receiving a handle steering input of the user and the suspension 100 is configured to be rotated so that the steering angle of the wheel is applied.

The central axis of the steering motor may be composed of the spline rod 620, and one end of the suspension 100 includes the inlet 111 so that the spline rod 620 is drawn into the suspension 100. The inlet 111 is configured to penetrate the upper end 110, and the spline rod 620 is configured to be located on at least a portion of the inlet 111.

Accordingly, as the spline rod 620 is rotated by the controller, the suspension 100 is configured to rotate integrally, and even when a gap or shock is generated in the longitudinal direction in which the suspension 100 and the steering input part 600 are fastened to each other, the spline rod 620 is configured to be moved vertically with respect to the inlet 111 to absorb the shock.

FIG. 7 illustrates a configuration of the steering input part fastened on the assist knuckle 200, as the exemplary embodiment of the present disclosure.

The steering input part 600 includes the suspension 100 fastened to and located on the upper portion of the assist knuckle 200 and fastened and located between the upper hole 210 and the lower hole 220 of the assist knuckle 200. The central axis of the steering input part 600 is inserted into and located on the inlet 111 of the suspension 100, and more specifically, the steering input part is configured so that the center axis of the steering input part 600 and the inlet 111 of the suspension 100 are located with respect to the upper hole 210 of the assist knuckle 200.

The suspension 100 is configured to have the degree of freedom of the rotation with respect to the inside of the assist knuckle 200 and the steering input part is configured to be fastened to the assist knuckle 200 to apply rotational force to the suspension 100. As illustrated in FIG. 6, the spline rod 620 is configured to be inserted into the inlet located on the upper end 110 of the suspension 100.

A cover part configuring the steering input part 600 includes a mounting part 630 fastened to the assist knuckle 200. In the exemplary embodiment of the present disclosure, the mounting part 630 includes a bolt hole, and the assist knuckle 200 is configured to include a fastener 230 corresponding to the mounting part 630. The mounting part 630 and the fastener 230 may be configured to be fixed to each other through one bolt. More specifically, the number of mounting parts 630 and the number of fasteners 230 may vary depending on the size of the steering input part 600 or the shape of the assist knuckle 200.

As described above, the steering input part 600 is fixed so that the central axis is located at a location corresponding to the upper hole 210 of the assist knuckle 200, and the steering input part 600 and the suspension 100 are configured to be fastened to each other through the rotation transfer unit 610 at a location corresponding to the upper hole 210.

FIG. 8 illustrates a configuration of the steering input part 600 fastened to the upper end of the assist knuckle 200, as another exemplary embodiment of the present disclosure.

As another exemplary embodiment of the present disclosure, the steering input part 600 may be located to be fastened to a fixing part 700 formed on the upper end of the assist knuckle 200, and the fixing part 700 configured to surround the circumference of the steering input part 600 may be provided.

The fixing part 700 may be configured to substantially correspond to the cover shape of the steering input part 600, and may include a groove part formed in a direction into which the steering input part 600 is inserted. Accordingly, a pinch bolt 710 is fastened vertically through the groove part, and a distance between the grooves is determined according to the rotation amount of the pinch bolt 710 so that the fixing part 700 limits the movement of the steering input part 600 by the rotational force of the pinch bolt 710. As described above, the steering input part 600 is configured to be fixed to the upper end of the assist knuckle 200 by the fastening force of the fixing part 700 and thus configured so that the rotational force may be applied to the suspension 100.

The above detailed description illustrates the present disclosure. In addition, the aforementioned contents illustrate and describe the exemplary embodiments of the present disclosure, and the present disclosure may be used in various other combinations, modifications, and environments. That is, the changes or modifications of the present disclosure may be possible within the scope of the concept of the disclosure disclosed in the present specification, the scope equivalent to the disclosed contents, and/or the scope of the technology or knowledge in the art. The described exemplary embodiments describe the best mode for implementing the technical spirit of the present disclosure, and various changes required in specific application fields and uses of the present disclosure are also possible. Accordingly, the aforementioned detailed description of the disclosure is not intended to limit the present disclosure to the disclosed exemplary embodiments. In addition, the appended claims should be interpreted to include other exemplary embodiments.

What is claimed is:

1. A suspension joining structure comprising:
    a lower arm having one end fastened to a vehicle body;
    an assist knuckle having a strut thereon;
    a fastening unit configured to connect one end of the lower arm and a lower end of the assist knuckle to each other;
    a suspension fastened to the assist knuckle and rotating independently of the assist knuckle to assist steering of a wheel;
    a steering input part connected to the assist knuckle, and configured such that a steering force is applied to the suspension upon steering; and
    a rotation transfer unit arranged between the suspension and the steering input part,
    wherein the steering input part comprises at least one mounting part fastened to the assist knuckle, and
    wherein the assist knuckle comprises a fastener at one end thereof, the fastener arranged to correspond to the at least one mounting part.

2. The suspension joining structure of claim 1, wherein the fastening unit includes a universal joint.

3. The suspension joining structure of claim 1, wherein the assist knuckle comprises:
    an upper hole on an upper end of the assist knuckle so that an upper end of the suspension extends through the upper hole; and
    a lower hole on the lower end of the assist knuckle so that a lower end of the suspension extends through the lower hole,
    wherein the suspension is configured to rotate with respect to the upper hole and the lower hole.

4. The suspension joining structure of claim 1, wherein the fastening unit comprises:
    a yoke arranged on the lower arm;
    a ball stud fastened to the assist knuckle; and
    a cross shaft arranged on the yoke and the ball stud so that the yoke and the ball stud have center axes different from each other.

5. The suspension joining structure of claim 1, wherein the rotation transfer unit comprises a spline rod arranged at a center axis of the steering input part, and
    wherein the suspension comprises an inlet so that the spline rod is configured to be seated into the inlet.

6. The suspension joining structure of claim 1, wherein the steering input part is arranged on an upper end of the assist knuckle in parallel to the strut.

7. The suspension joining structure of claim 1, further comprising a fixing part into which the steering input part is fitted at an upper end of the assist knuckle.

8. The suspension joining structure of claim 7, wherein the fixing part comprises grooves defined in a direction into which the steering input part is inserted, and
    wherein the steering input part and the assist knuckle are connected to each other through a pinch bolt fastened between the grooves.

* * * * *